United States Patent
Bai et al.

(10) Patent No.: US 8,908,310 B1
(45) Date of Patent: Dec. 9, 2014

(54) ADAPTIVE SHINGLE GUARD BAND

(71) Applicant: Western Digital Technologies, Inc., Irvine, CA (US)

(72) Inventors: Zhigang Bai, Fremont, CA (US); Davide Guarisco, San Jose, CA (US); Zhihao Li, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/017,136

(22) Filed: Sep. 3, 2013

Related U.S. Application Data

(60) Provisional application No. 61/845,215, filed on Jul. 11, 2013.

(51) Int. Cl.
G11B 5/09 (2006.01)
G11B 20/12 (2006.01)

(52) U.S. Cl.
CPC .................................. *G11B 20/1217* (2013.01)
USPC .......................................................... 360/48

(58) Field of Classification Search
None
See application file for complete search history.

(56) References Cited

U.S. PATENT DOCUMENTS

| | | |
|---|---|---|
| 6,185,063 B1 | 2/2001 | Cameron |
| 6,680,609 B1 | 1/2004 | Fang et al. |
| 6,992,849 B2 | 1/2006 | Yeo et al. |
| 7,082,007 B2 | 7/2006 | Liu et al. |
| 7,102,838 B2 | 9/2006 | Kim et al. |
| 7,133,241 B2 | 11/2006 | Che et al. |
| 7,440,221 B2 | 10/2008 | Tsuchinaga et al. |
| 7,768,729 B2 | 8/2010 | Moser et al. |
| 7,843,658 B2 | 11/2010 | Kiyono |
| 7,907,361 B2 | 3/2011 | Deng et al. |
| 7,982,989 B1 | 7/2011 | Shi et al. |
| 8,125,723 B1 | 2/2012 | Nichols et al. |
| 8,125,724 B1 | 2/2012 | Nichols et al. |
| 2013/0246703 A1* | 9/2013 | Bandic et al. ................. 711/113 |

* cited by examiner

*Primary Examiner* — Regina N Holder

(57) ABSTRACT

Adaptively determining shingle guard band widths on at least one disk of a data storage device (DSD). The at least one disk includes a plurality of zones of shingle tracks for storing data. At least one of a magnetic erase width (MEW) and a magnetic read width (MRW) are measured and a shingle track pitch (STP) is determined. The shingle guard band width is determined based at least partly on the STP and at least one of the MEW or the MRW.

22 Claims, 11 Drawing Sheets

ADAPTIVE SHINGLE GUARD BAND

CROSS-REFERENCE TO RELATED APPLICATION(S)

This application claims the benefit of U.S. Provisional Application No. 61/845,215, filed on Jul. 11, 2013, which is hereby incorporated by reference in its entirety.

BACKGROUND

In a shingled magnetic recording (SMR) drive, data tracks are written in a partially overlapped manner to increase data density and overall drive capacity. An SMR drive may be divided into multiple shingle zones according to one approach of formatting an SMR drive. In such a case, each shingle zone has a user data area and a guard band area. Due to the overlapping nature of the written tracks, a guard band may be necessary to separate two adjacent shingle zones to prevent data corruption.

BRIEF DESCRIPTIONS OF THE DRAWINGS

The features and advantages of the implementations of the present disclosure will become more apparent from the detailed description set forth below when taken in conjunction with the drawings. The drawings and the associated descriptions are provided to illustrate implementations of the disclosure and not to limit the scope of what is claimed.

Figure 1:
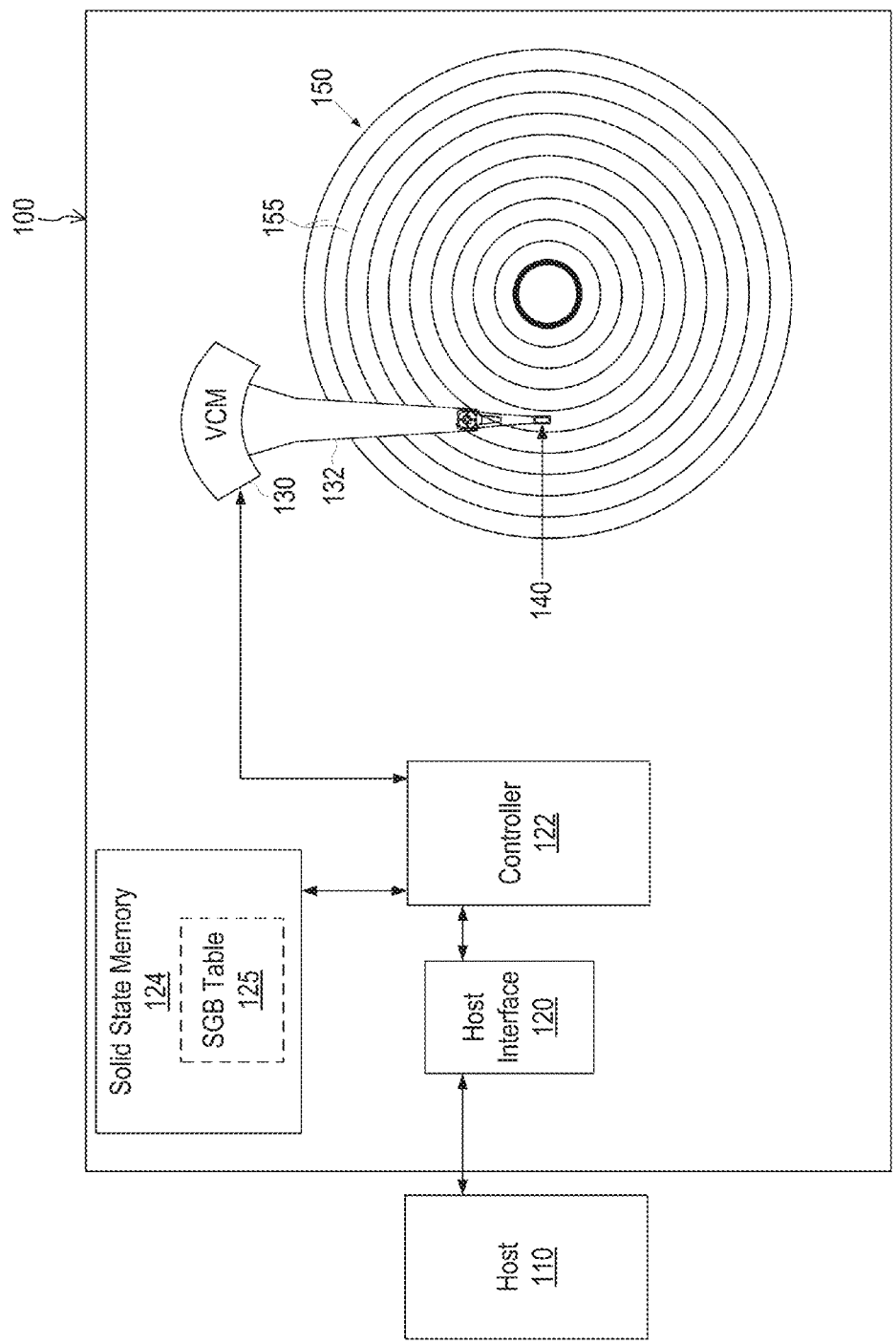
Figure 2A:
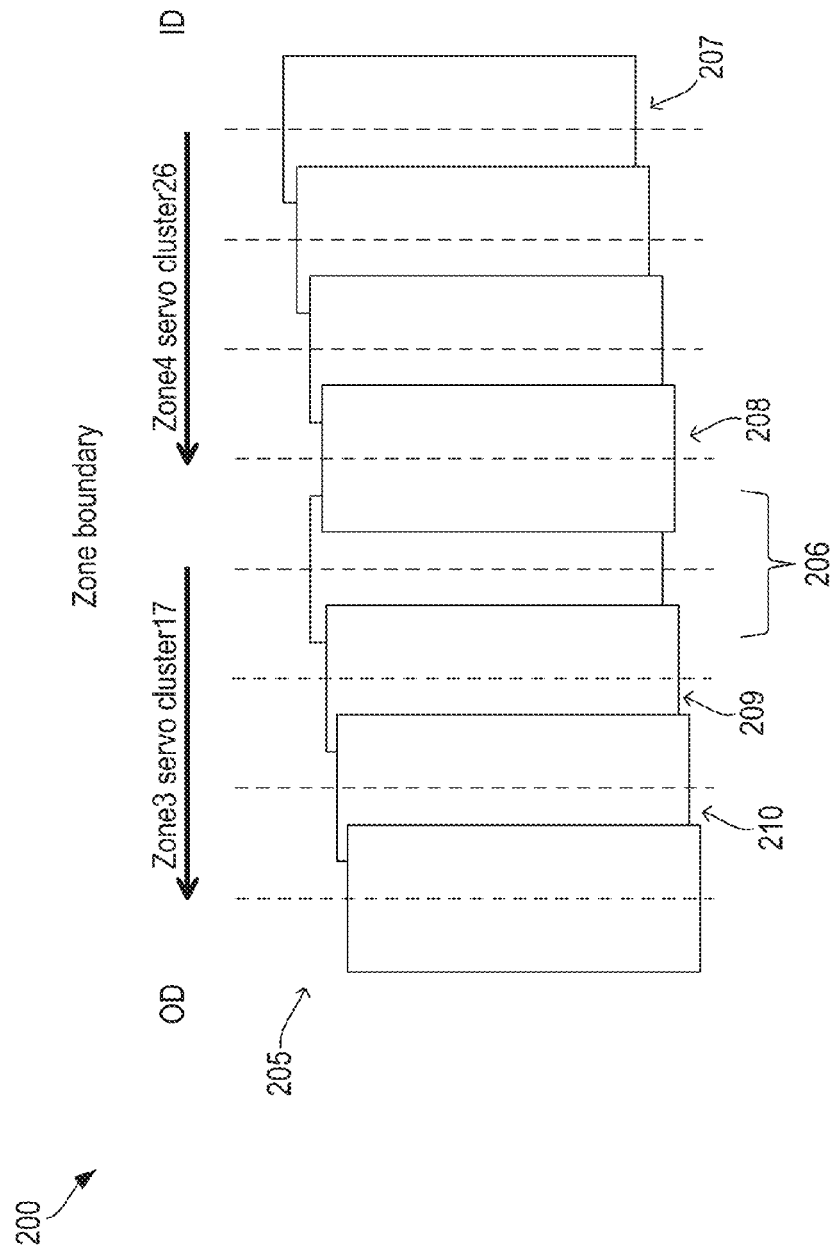
Figure 2B:
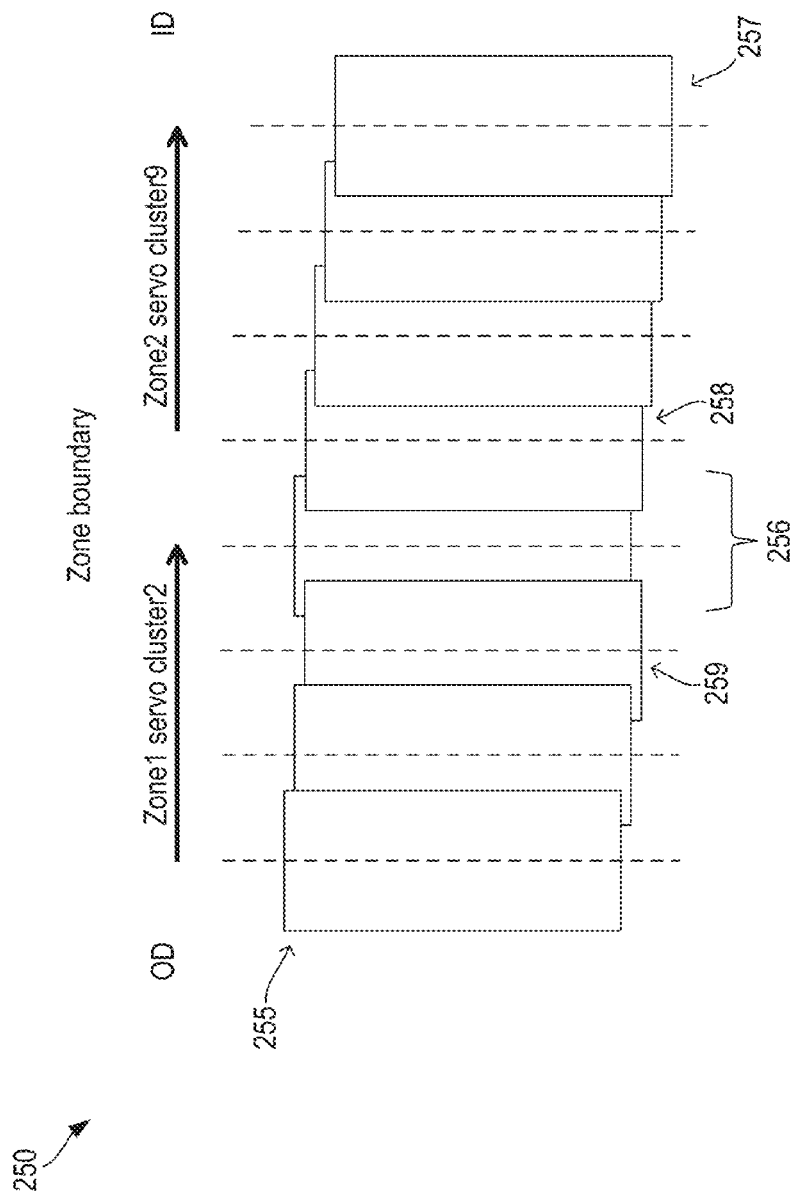

FIG. 1 presents a block diagram of a data storage device according to one implementation of the present disclosure;

FIG. 2A presents a conceptual diagram of shingled tracks according to one implementation of the present disclosure;

FIG. 2B presents a conceptual diagram of shingled tracks according to another implementation of the present disclosure.

Figure 3A:
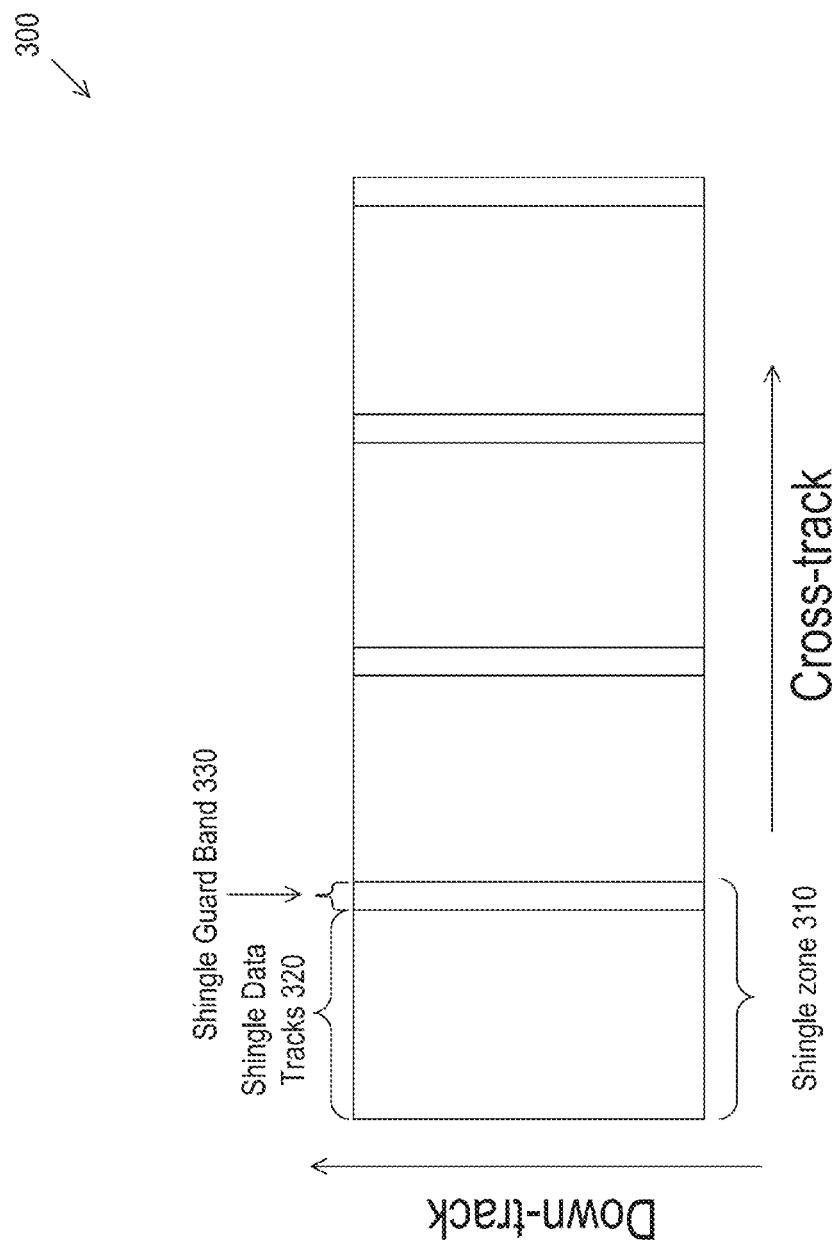
Figure 3B:
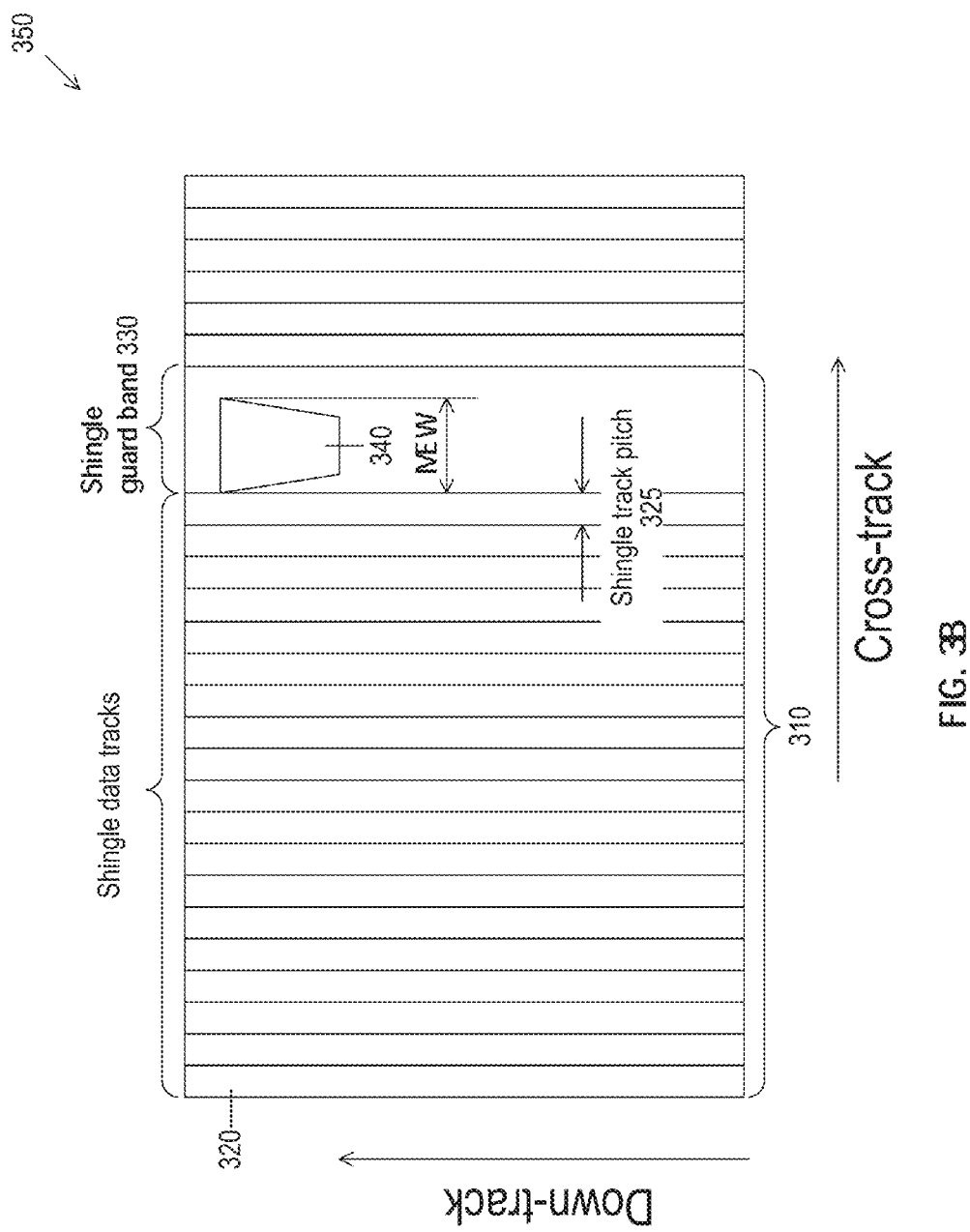
Figure 4:
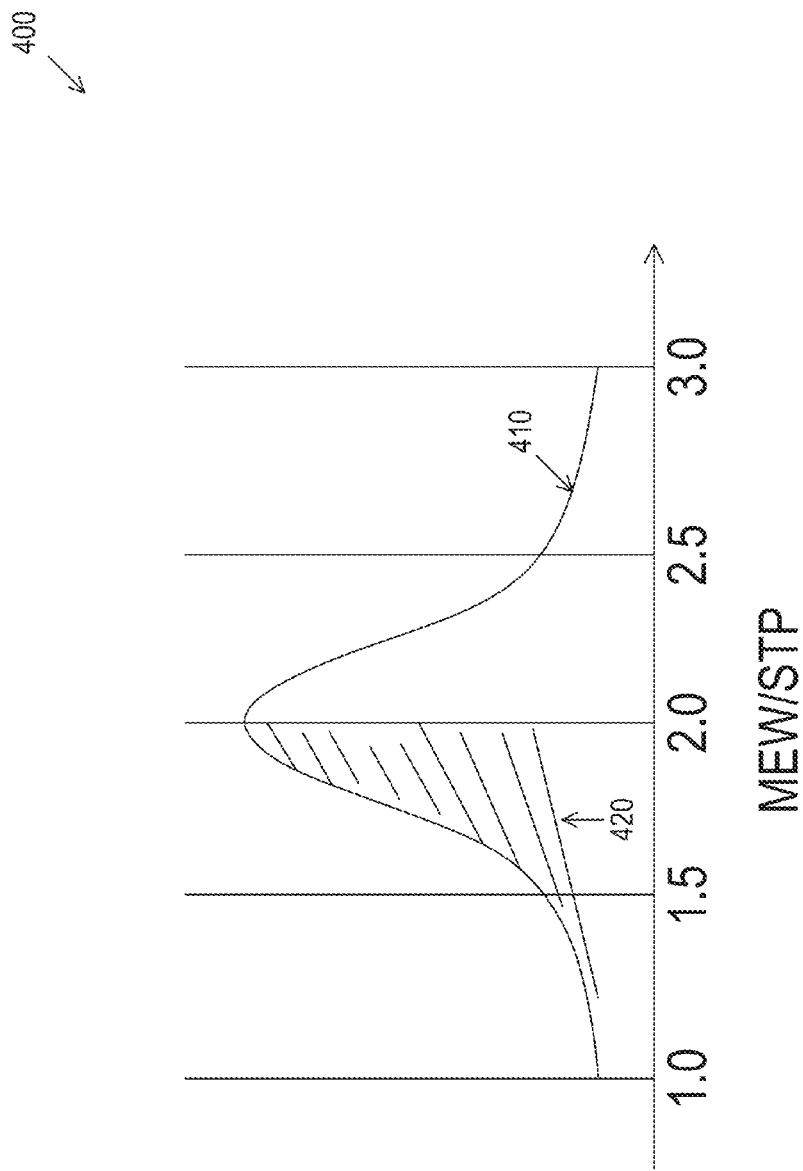
Figure 5:
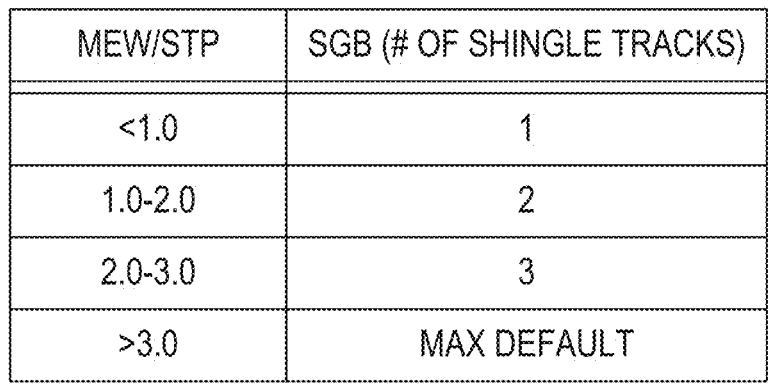
Figure 6:
Figure 7A:
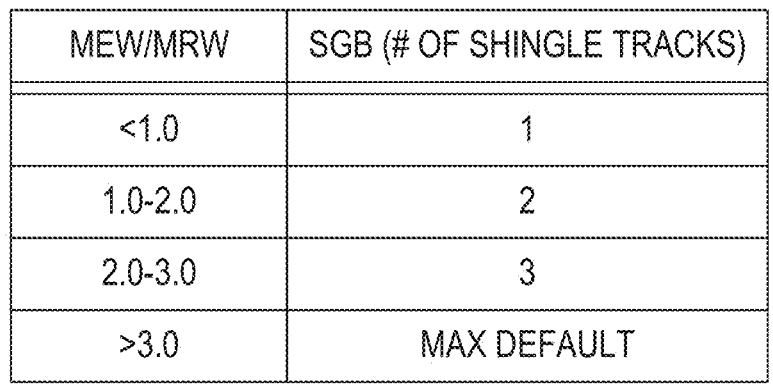
Figure 7B:
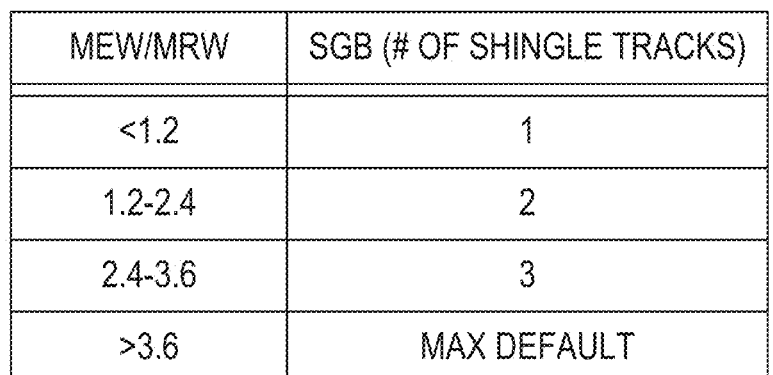
Figure 8:
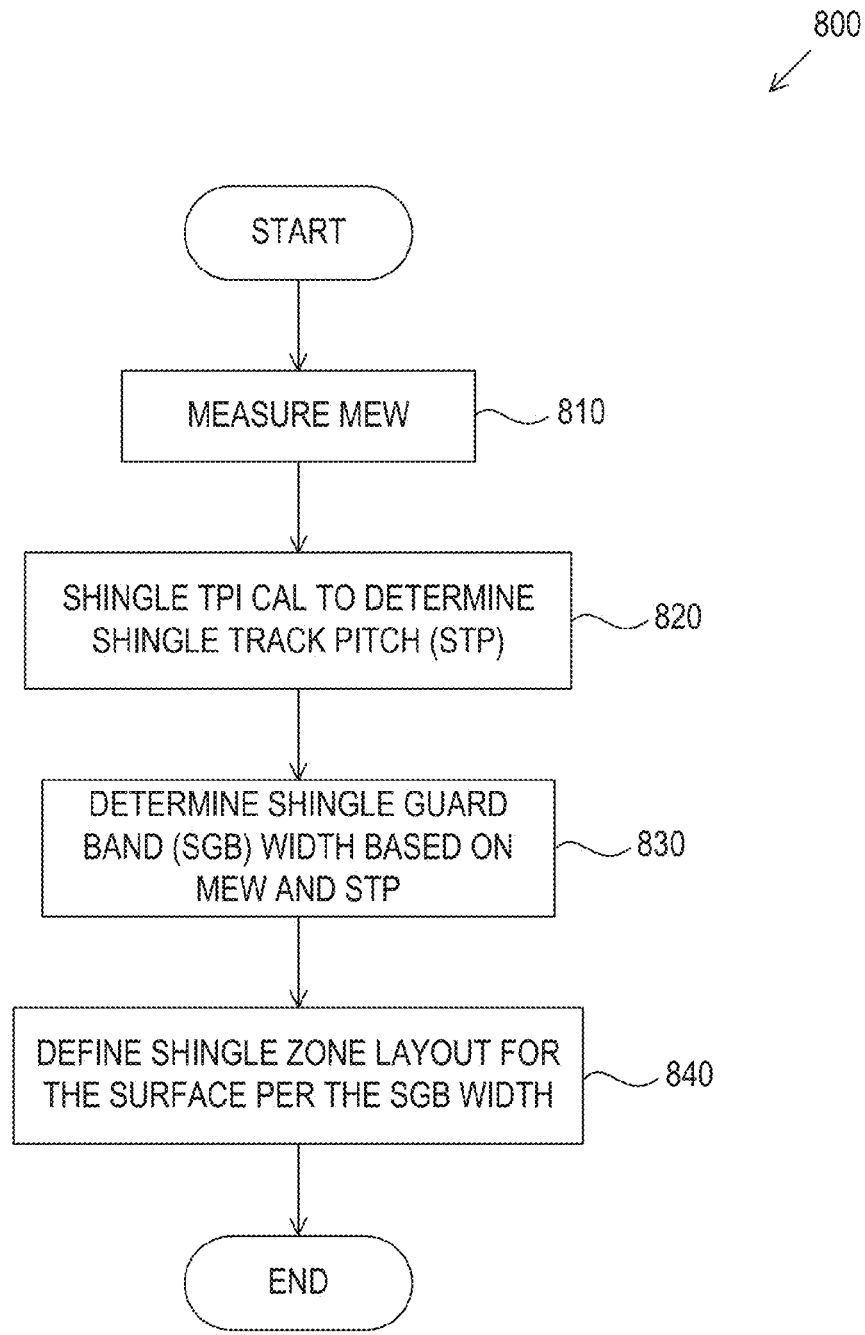
Figure 9:
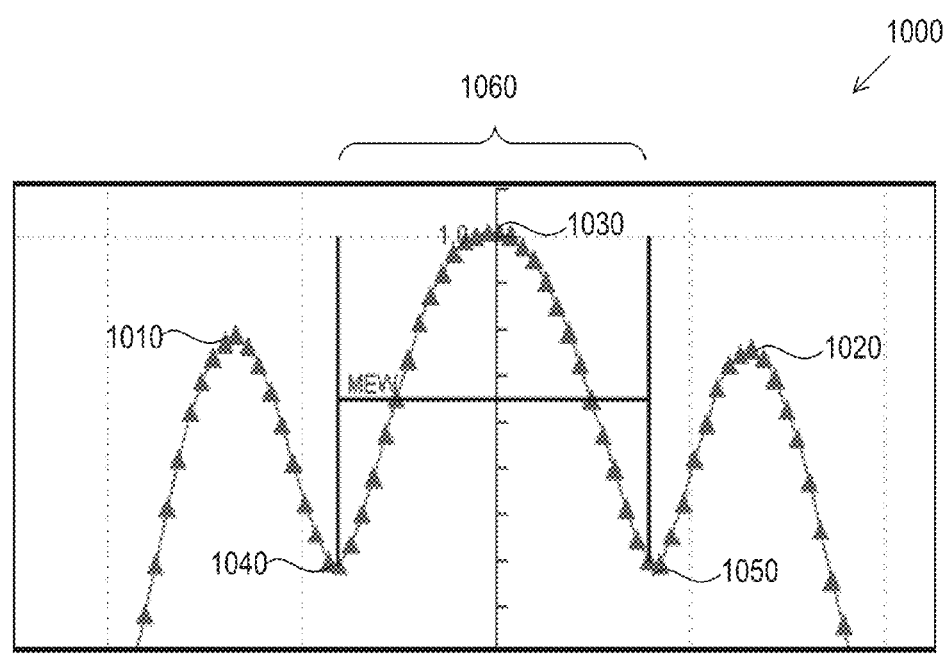
Figure 10:
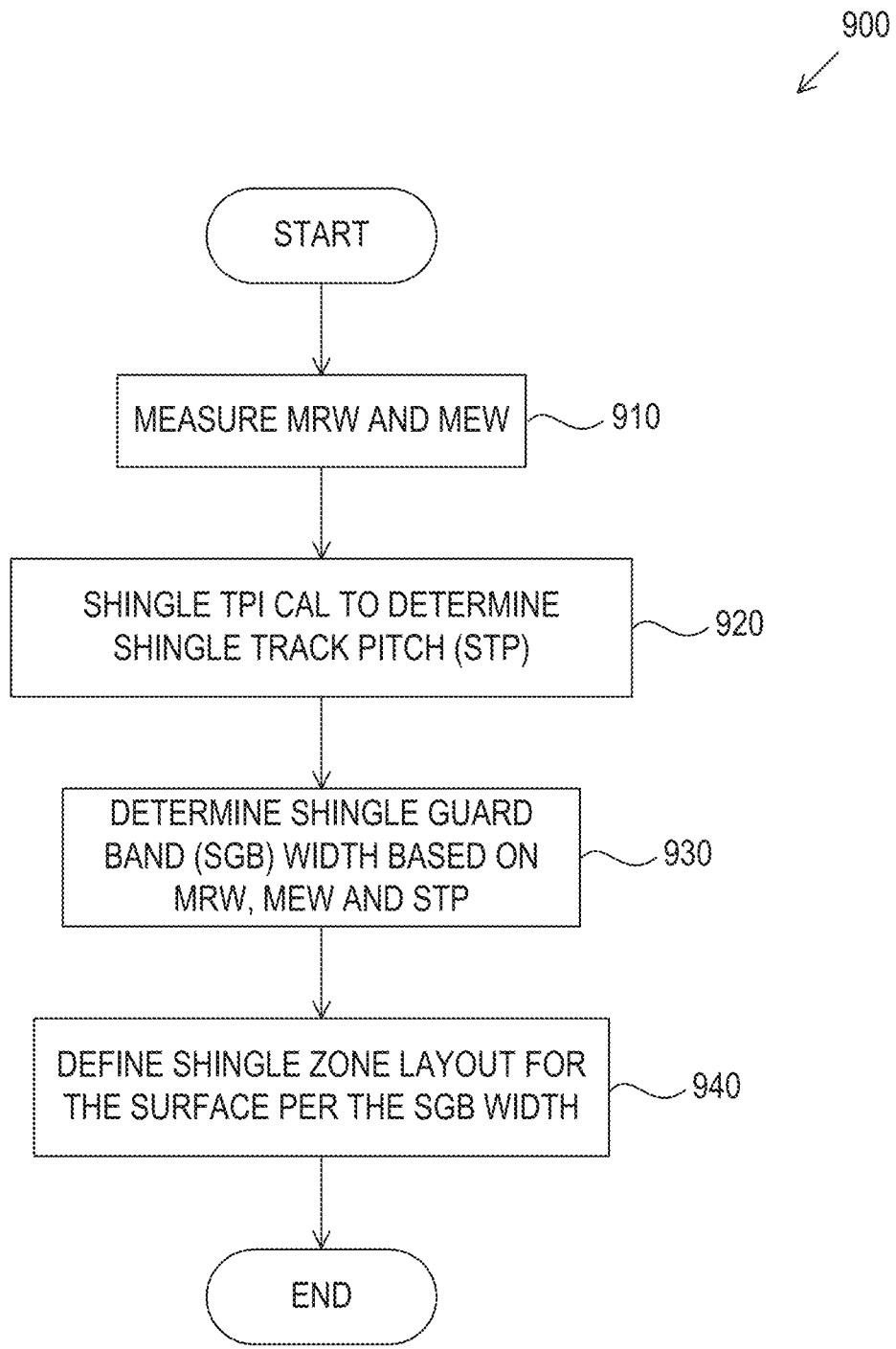

FIG. 3A presents a conceptual diagram of shingle zones according to one implementation of the present disclosure;

FIG. 3B presents a more detailed view of the diagram of FIG. 3A;

FIG. 4 presents a graph of head populations according to one implementation of the present disclosure;

FIG. 5 presents a table of shingle guard band width values according to one implementation of the present disclosure;

FIG. 6 presents a table of shingle guard band width values according to one implementation of the present disclosure;

FIG. 7A presents a table of shingle guard band width values according to one implementation of the present disclosure;

FIG. 7B presents a table of shingle guard band width values according to one implementation of the present disclosure;

FIG. 8 presents a flowchart of an adaptive shingle guard band format operation according to one implementation of the present disclosure;

FIG. 9 presents a graph of measuring a magnetic erase width (MEW) according to one implementation of the present disclosure; and FIG. 10 presents a flowchart of an adaptive shingle guard band format operation according to one implementation of the present disclosure.

DETAILED DESCRIPTION

In the following detailed description, numerous specific details are set forth to provide a full understanding of the present disclosure. It will be apparent, however, to one of ordinary skill in the art that the various implementations disclosed may be practiced without some of these specific details. In other instances, well-known structures and techniques have not been shown in detail to avoid unnecessarily obscuring the various implementations.

FIG. 1 presents one implementation of a data storage device (DSD) 100 connected to a host 110. The host 110 may be a computer, such as a desktop, a laptop, or a mobile device. The data storage device 100 may be a hard disk drive (HDD). The data storage device 100 includes a host interface 120, a controller 122, a voice coil motor (VCM) 130, an actuator arm 132, a head 140, and a platter 150. The data storage device 100 also includes a solid state memory 124, but other implementations may not have the solid state memory 124. The solid state memory 124 may be used as an internal cache, or may be available for storing data from the host 110. The solid state memory 124 may optionally store an SGB table 125. The SGB table 125 may store default SGB width values, which may be similar to tables 500, 600, 700, or 750 discussed below with respect to FIGS. 5-7B.

While the description herein refers generally to solid state memory, it is understood that other implementations can include one or more of various types of solid state memory such as Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete non-volatile memory (NVM) chips, or any combination thereof.

The host 110 communicates with the data storage device 100 through the host interface 120. The host interface 120 communicates with the controller 122, which further communicates with the solid state memory 124 and the VCM 130. The VCM 130 operates in conjunction with the actuator arm 132 to position the head 140 over a desired track 155 of the platter 150. Although not shown in FIG. 1, another head 140 is positioned adjacent a bottom surface of the platter 150 such that both sides of the platter 150 can be utilized. Further, the data storage device 100 has multiple platters 150, each having two heads 140.

Shingled magnetic recording (SMR) can improve the density of magnetic disk storage, such as the platters 150. Writing data to a magnetic medium generally requires a stronger magnetic field than reading data. As such, the head 140 writes a wide track, but reads a narrow track. SMR takes advantage of the discrepancy between the width of the written track and the width of the read track. The tracks can be placed closer to improve density. Because only a narrow track is read, the rest of the wide written track can be overwritten while maintaining the integrity of the narrow track for reading. As long as the narrow track is not overwritten, adjacent tracks may overlap.

FIG. 2A presents a conceptual diagram 200 of shingled tracks 205 written from an inner disk (ID) location to an outer disk (OD) location. The tracks 205 overlap like roof shingles. In FIG. 2A, writing may begin with track 209, with successive tracks 205, such as track 210, overlapping the left side of the previous track. Writing may continue with the rightmost track 207, and continuing left to track 208. However, the track 206 gets overlapped on both sides, becoming unreadable. In order to preserve data integrity, the track 206 is designated as a guard band and is not used.

FIG. 2B presents a conceptual diagram 250 of shingled tracks 255 written from an OD location to an ID location. Similar to tracks 205 in FIG. 2A, the tracks 255 overlap like roof shingles. With no guard band in place, writing may begin with track 256, with successive tracks 255, such as track 259, overlapping the left side of the previous track. Writing may continue with the rightmost track 257, and continuing left to track 258. However, the track 256 gets overlapped on both sides, becoming unreadable. In order to preserve data integrity, the track 256 is designated as a guard band and is not used.

Conventionally, the same guard band width is used for all shingle zones. However, certain shingle zones do not require as wide guard bands as other shingle zones on the SMR drive. If the widest needed width is used for all zones, the width may be larger than needed for certain zones, resulting in reduced formatting efficiency.

FIG. 3A illustrates a conceptual layout 300 of shingle zones on a shingle HDD. A shingle zone 310 includes a plurality of shingle data tracks 320, and a shingle guard band (SGB) 330. FIG. 3B illustrates a zoomed in conceptual layout 350 of the layout 300 in FIG. 3A. In SMR, a magnetic erase width (MEW) 340 of the head, such as the head 140, is wider than a shingle track pitch (STP) 325 of a shingle data track 320. The MEW 340 corresponds to a width on the disk where data can become corrupted due to adjacent writing on the disk by the head. The STP 325 corresponds to the distance the head is mechanically moved between tracks, which further corresponds to a track width for the non-overlapped portion of a shingle track. Therefore, the SGB 330 can be wider than the MEW 340 to protect the next shingle zone from being erased, as seen in FIG. 3B. Although the STP 325 and the MEW 340 do not vary within the shingle zone 310, each shingle zone 310 may have an MEW and/or STP that differs from those of other shingle zones 310. For instance, the MEW may change when going from an outer disk area to an inner disk area of the platter 150.

The MEW 340 may be described in terms of a ratio of MEW to STP. Depending on the head design, the MEW 340 may be a multiple of the width of the STP 325, such as three times the width. To accommodate the widest MEW 340, i.e. 3×STP 325, the SGB 330 may be set to 3×STP 325. However, setting a wide SGB 330 sacrifices available data tracks. For example, if the shingle zone 310 has 100 shingle data tracks 320, then the format efficiency overhead is 3%. Heads with an MEW less than 2×STP would only require a shingle guard band having a 2×STP width. In some implementations, format efficiency is improved by calibrating the shingle guard band width based at least partly on the MEW, magnetic read width (MRW) and/or STP of each zone to thereby reduce the overall space allocated to shingle guard bands on a platter.

FIG. 4 depicts a graph 400 showing a head MEW population with respect to STP multiples. The curve 410 is a bell curve centered at 2×STP, with an upper limit of 3×STP. Portion 420 of the head population, which is approximately half of the head population, only requires a shingle guard band width of 2×STP or less. By adaptively setting the shingle guard band width to 2×STP for the portion 420, the format efficiency overhead is lowered. For example, assuming 100 tracks per shingle zone, the overhead is 2% rather than 3%, such that up to half of the head population gains a 1% format efficiency.

FIG. 5 presents a table 500 showing the assigned shingle guard band width based on the MEW, according to one implementation of the present disclosure. When the MEW is less than 1×STP, the shingle guard band width is set to 1×STP, e.g. a coefficient of 1. When the MEW is between 1.0-2.0×STP, the shingle guard band width is set to 2×STP, e.g. a coefficient of 2. When the MEW is between 2.0-3.0×STP, the shingle guard band width is set to 3×STP, e.g. a coefficient of 3. When the MEW is greater than 3.0×STP, the shingle guard band width may be set to a maximum default value, such as 4.0× STP or any other suitable coefficient. In other implementations, the shingle guard band width may be selected based on a ceiling value of the MEW. In yet other implementations, a fail condition may occur when the MEW is too great. However, when the MEW (or the head) is too wide, the data storage device's performance would decrease. Although FIG. 5 depicts integer coefficients (i.e. 1, 2, or 3), in other implementations fractional coefficients, such as 1.5, may be utilized.

FIG. 6 presents a table 600 showing the assigned shingle guard band width based on the MEW, according to one implementation of the present disclosure. In contrast to the table 500, the shingle guard band values are given a 0.2×STP buffer. When the MEW is less than 0.8×STP, the shingle guard band width is set to 1×STP. When the MEW is between 0.8-1.8×STP, the shingle guard band width is set to 2×STP. When the MEW is between 1.8-2.8×STP, the shingle guard band width is set to 3×STP. When the MEW is greater than 2.8×STP, the shingle guard band width may be set to a maximum default value, such as 4×STP. In other implementations, the shingle guard band width may be selected based on a ceiling value of the MEW. In yet other implementations, a fail condition may occur when the MEW is too great. Moreover, in other implementations, the 0.2×STP buffer may be greater or smaller as needed. In other words, the buffer may be determined based on usage requirements of the data storage device. Although FIG. 6 depicts integer coefficients (i.e. 1, 2, or 3), in other implementations fractional coefficients, such as 1.5, may be utilized.

FIG. 7A presents a table 700 showing the assigned shingle guard band width based on the magnetic read width (MRW), according to one implementation of the present disclosure. The magnetic read width corresponds to a width of a shingle track that is not overlapped to maintain data integrity of the non-overlapped portion of the shingle track. When the MEW is less than 1×MRW, the shingle guard band width is set to 1×MRW. When the MEW is between 1.0-2.0×MRW, the shingle guard band width is set to 2×MRW. When the MEW is between 2.0-3.0×MRW, the shingle guard band width is set to 3×MRW. When the MEW is greater than 3.0×MRW, the shingle guard band width may be set to a maximum default value, such as 4.0×MRW. In other implementations, the shingle guard band width may be selected based on a ceiling value of the MEW. In yet other implementations, a fail condition may occur when the MEW is too great. Although FIG. 7A depicts integer coefficients (i.e. 1, 2, or 3), in other implementations fractional coefficients, such as 1.5, may be utilized.

FIG. 7B presents a table 750 showing the assigned shingle guard band width based on the MRW, according to one implementation of the present disclosure. In contrast to the table 700, the shingle guard band values are given a 0.2×MRW buffer. When the MEW is less than 1.2×MRW, the shingle guard band width is set to 1×MRW. When the MEW is between 1.2-2.4×MRW, the shingle guard band width is set to 2×MRW. When the MEW is between 2.4-3.6×MRW, the shingle guard band width is set to 3×MRW. When the MEW is greater than 3.6×MRW, the shingle guard band width may be set to a maximum default value, such as 4×MRW. In other implementations, the shingle guard band width may be selected based on a ceiling value of the MEW. In yet other implementations, a fail condition may occur when the MEW is too great. Moreover, in other implementations, the 0.2× MRW buffer may be greater or smaller as needed. In other words, the buffer may be determined based on usage requirements of the data storage device. Although FIG. 7B depicts integer coefficients (i.e. 1, 2, or 3), in other implementations fractional coefficients, such as 1.5, may be utilized.

FIG. 8 presents a flowchart 800 for an adaptive shingle guard band format operation according to an implementation of the present disclosure. Because each head may have different properties, and each shingle zone has its own MEW and STP values, this operation may be repeated for each shingle zone. At 810, the MEW is measured. The MEW may be measured using methods known in the art. For example, the MEW may be measured by writing two adjacent tracks, then writing a track in the middle, and detecting where the magnetic signals decrease. Alternatively, the MEW may be stored in a lookup table.

FIG. 9 depicts a graph 1000 of one method of measuring the MEW based on the strength of magnetic signals. A track 1010 is written at about +/−70% of a track pitch at a frequency t−25 kHz. An adjacent track 1020 is also written at about +/−70% of a track pitch at a frequency t−25 kHz. A center track 1030 is written between the track 1010 and 1020 at a frequency t+25 kHz. A narrow band filter is set to the frequency t to perform a scan, the results of which may resemble the graph 1000. Starting from the center, the data to the left (−x direction) is inspected to find a left local minimum 1040. Then, starting again from the center, the data to the right (+x direction) is inspected to find a right local minimum 1050. An MEW 1060 is then calculated as the right local minimum 1050 minus the left local minimum 1040.

Returning to FIG. 8, at 820, a shingle tracks-per-inch (TPI) calibration (TPI cal) is performed to determine STP. A TPI cal is a process performed after assembling a data storage device, which allows the data storage device to adapt to each head and determine tracks-per-inch.

At 830, the shingle guard band width is determined. The shingle guard band width may be adaptively determined using the values from tables 500 or 600 for example. If using a buffer, as in table 600, the buffer width may vary as needed to accommodate additional requirements. For example, if the shingle band must be rewritten multiple times, a wider buffer may be needed. Enterprise products may have different buffer requirements than consumer products. Other events, such as micro jogging, may require a different buffer size. In addition, different data storage devices have different mechanical performances, such that the buffer may be device specific.

Alternatively, rather than using a lookup table, the shingle guard band width may be dynamically calculated. For example, in an analogue method, the shingle guard band width may be the MEW plus a margin value. The margin value may be constant, such as from 0.2 to 1 micro inch, or may be dynamic. In another implementation, the shingle guard band width may be calculated as the MEW times a coefficient of 1 plus alpha (a buffer value). Alpha is greater than zero, such as from 0.1 to 0.5.

At 840, the shingle zone layout for the surface of the disk is defined according to the shingle guard band width. Each shingle zone can have its own profile and shingle guard band widths. By adaptively assigning the shingle guard band widths, the amount of unused portions of the disk is reduced, while maintaining sufficiently wide shingle guard bands to preserve data integrity.

FIG. 10 presents a flowchart 900 for an adaptive shingle guard band format operation according to an implementation where the shingle guard band width is based on a magnetic read width. Because each head may have different properties, and each shingle zone has its own magnetic read width and STP values, this operation may be repeated for each shingle zone. At 910, the magnetic read width is measured. The magnetic read width may be measured using methods known in the art, such as a microtrack. Alternatively, the magnetic read width may be stored in a lookup table.

At 920, a shingle tracks-per-inch calibration (TPI cal) is performed to determine STP and magnetic read width. Because the STP can be bigger than the magnetic read width, the magnetic read width can be used as a reference for track pitch, and the tracks-per-inch count can be fine-tuned in the data storage device.

At 930, the shingle guard band width is determined. The shingle guard band width may be determined using the values from table 700. Similar to table 600, a buffer may be used to accommodate additional requirements.

At 940, the shingle zone layout for the surface of the disk is defined according to the shingle guard band width. Each shingle zone can have its own profile and shingle guard band widths. By adaptively assigning the shingle guard band widths, the amount of unused portions of the disk is reduced, while maintaining sufficiently wide shingle guard bands to preserve data integrity.

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example implementations is provided to enable any person of ordinary skill in the art to make or use the implementations in the present disclosure. Various modifications to these examples will be readily apparent to those of ordinary skill in the art, and the principles disclosed herein may be applied to other examples without departing from the spirit or scope of the present disclosure. The described implementations are to be considered in all respects only as illustrative and not restrictive and the scope of the disclosure is, therefore, indicated by the following claims rather than by the foregoing description. All changes which come within the meaning and range of equivalency of the claims are to be embraced within their scope.

The invention claimed is:

1. A data storage device (DSD) comprising:
   at least one disk including a disk surface for storing data in a plurality of zones of shingle tracks;
   a head for writing data in the shingle tracks of the plurality of zones; and
   a controller configured to:
      determine at least one of a magnetic erase width (MEW) and a magnetic read width (MRW) of the head;
      determine a shingle track pitch (STP); and
      determine a shingle guard band (SGB) width of at least one unused track based at least partly on the STP and at least one of the MEW or the MRW.

2. The DSD of claim 1, wherein a shingle zone layout for the plurality of zones is based on the SGB width.

3. The DSD of claim 1, wherein the controller is further configured to:
   determine a ratio of MEW or MRW to STP; and
   determine the SGB width based on the ratio of MEW or MRW to STP.

4. The DSD of claim 3, wherein the controller is further configured to:
   determine a coefficient of STP greater than the ratio of MEW or MRW to STP; and
   set the coefficient of STP as the SGB width.

5. The DSD of claim 3, wherein the controller is further configured to:
   determine a coefficient of STP greater than the ratio of MEW or MRW to STP plus a buffer value; and
   set the coefficient of STP as the SGB width.

6. The DSD of claim 5, wherein the buffer value is determined based on usage requirements of the DSD.

7. The DSD of claim 3, wherein the controller is further configured to:
   identify a range of values that includes the determined ratio of MEW or MRW to STP; and
   set the SGB width to an SGB width assigned for the identified range of values.

8. The DSD of claim 7, wherein the identified range of values incorporates a buffer value for the ratio of MEW or MRW to STP.

9. The DSD of claim 1, wherein the controller is further configured to set the SGB width as the MEW plus a margin value.

10. The DSD of claim 1, wherein the controller is further configured to determine a number of shingle tracks in a given radial distance on the disk surface.

11. The DSD of claim 10, wherein the controller is further configured to perform a calibration process of the number of shingle tracks on a portion of the disk surface.

12. A method for a data storage device (DSD) with shingle tracks, the method comprising:
    determining at least one of a magnetic erase width (MEW) and a magnetic read width (MRW) of a first head in the DSD;
    determining a shingle track pitch (STP) for a first disk surface of the DSD; and
    determining a shingle guard band (SGB) width of at least one unused track for a plurality of zones of shingle tracks based at least partly on the STP and at least one of the MEW or the MRW.

13. The method of claim 12, further comprising defining a shingle zone layout for the plurality of zones based on the SGB width.

14. The method of claim 12, wherein determining the SGB width further comprises:
    determining a ratio of MEW or MRW to STP; and
    determining the SGB width based on the ratio of MEW or MRW to STP.

15. The method of claim 14, wherein determining the SGB width further comprises:
    determining a coefficient of STP greater than the ratio of MEW or MRW to STP; and
    setting the coefficient of STP as the SGB width.

16. The method of claim 14, wherein determining the SGB width further comprises:
    determining a coefficient of STP greater than the ratio of MEW or MRW to STP plus a buffer value; and
    setting the coefficient of STP as the SGB width.

17. The method of claim 16, wherein the buffer value is determined based on usage requirements of the DSD.

18. The method of claim 14, wherein determining the SGB width further comprises:
    identifying a range of values that includes the determined ratio of MEW or MRW to STP; and
    setting the SGB width to an SGB width assigned for the identified range of values.

19. The method of claim 18, wherein the identified range of values incorporates a buffer value for the ratio of MEW or MRW to STP.

20. The method of claim 12, wherein determining the SGB width further comprises:
    setting the SGB width as the MEW plus a margin value.

21. The method of claim 12, wherein determining the STP further comprises determining a number of shingle tracks in a given radial distance on the disk surface.

22. The method of claim 21, wherein determining the number of shingle tracks in a given radial distance further comprises performing a calibration process of the number of shingle tracks on a portion of the disk surface.

* * * * *